July 31, 1962

K. SALNA 3,047,308

MOTOR VEHICLE AXLE SUPPORT

Filed Aug. 1, 1960

INVENTOR
KARL SALNA

Paul O. Pippel
ATTORNEY

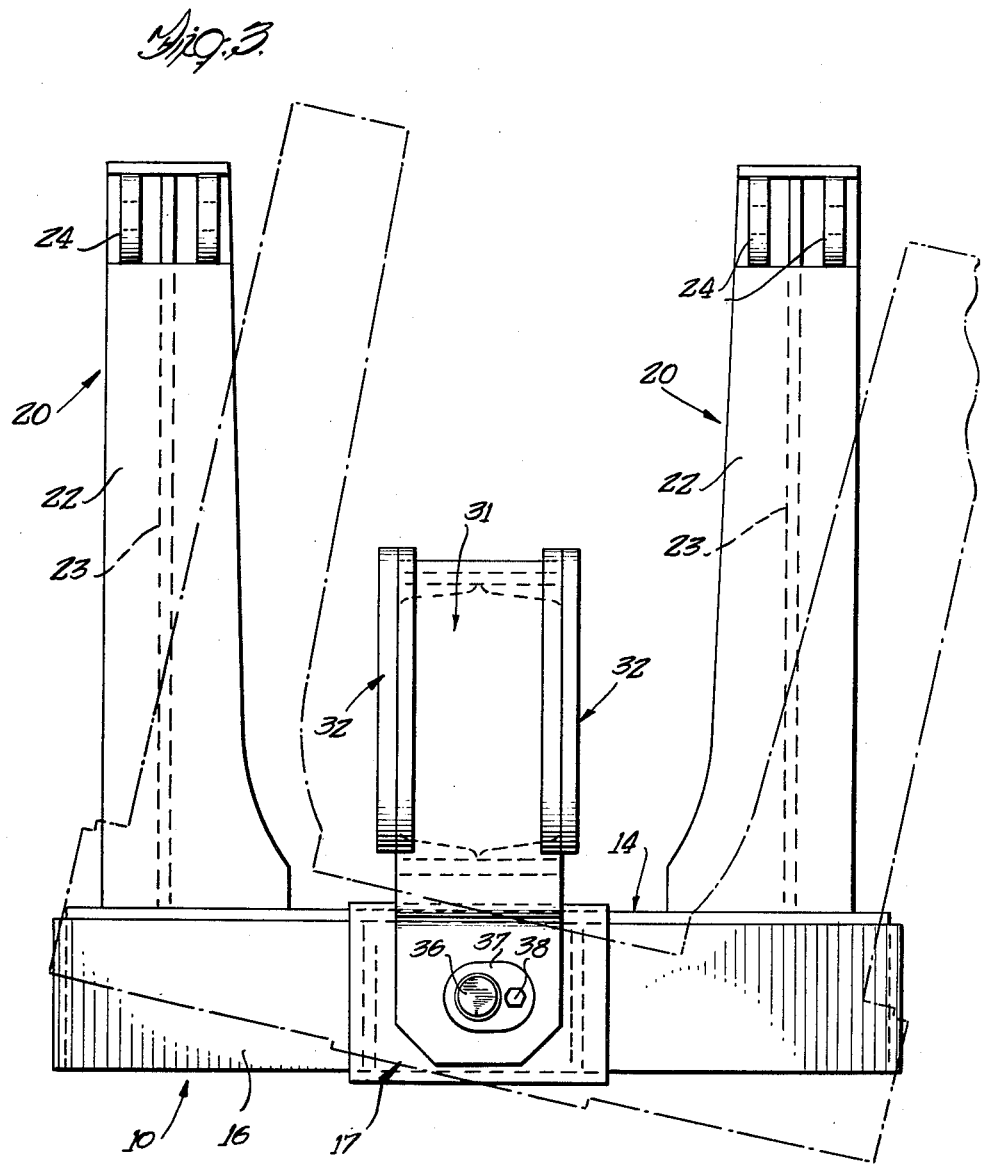

July 31, 1962 K. SALNA 3,047,308
MOTOR VEHICLE AXLE SUPPORT
Filed Aug. 1, 1960 3 Sheets-Sheet 3
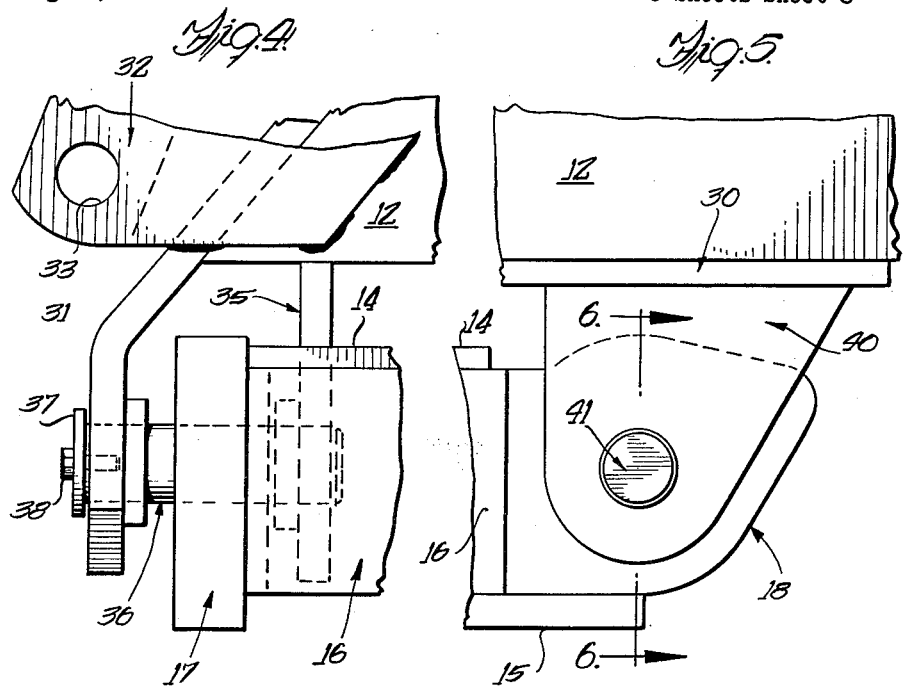
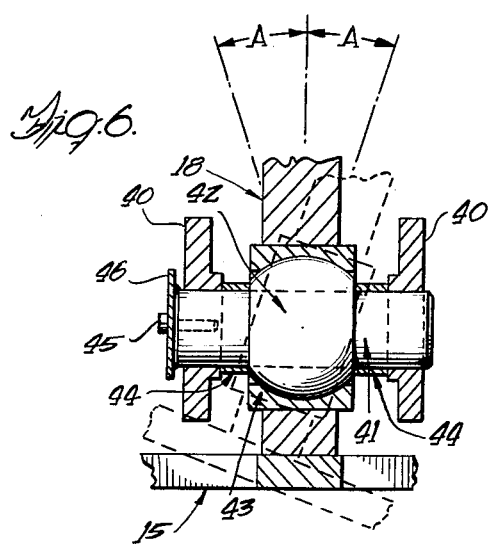
INVENTOR
KARL SALNA
Paul O. Pippel
ATTORNEY

United States Patent Office 3,047,308
Patented July 31, 1962

3,047,308
MOTOR VEHICLE AXLE SUPPORT
Karl Salna, Mundelein, Ill., assignor to The Frank G. Hough Co., a corporation of Illinois
Filed Aug. 1, 1960, Ser. No. 46,500
7 Claims. (Cl. 280—111)

This invention relates generally to motor vehicle constructions and more specifically to an improved axle carrier construction for the oscillating axle of a four-wheeled tractor.

In various types of tractor constructions it is often desirable to provide means whereby one of the axle assemblies of the tractor may oscillate about a longitudinal axis relative to the tractor body. Due to inherent manufacturing clearances and tolerances in such assemblies, it has been generally difficult to produce arrangements which would eliminate the impact forces produced in such constructions with normal manufacturing tolerances.

It is the object of the present invention to provide a unique arrangement for pivotally supporting an axle assembly relative to a tractor body wherein a simple and reliable assembly is provided.

It is a further object of the present invention to provide a novel pin and bearing arrangement between the axle carrier and body of a tractor wherein the undesirable clearances between the carrier and body are removed, although even larger clearances are permitted in areas previously producing certain movements which produced undesirable impact forces.

Other objects and features of the present invention will be apparent upon a perusal of the following specification and drawings, of which:

FIGURE 3 is a partial enlarged end view of the structure shown in FIGURE 1;

FIGURE 4 is an enlarged view of the area about the rear pivot pin shown in FIGURE 1;

FIGURE 5 is an enlarged view of the structure about the front pivot pin; and

FIGURE 6 is a cross-sectional view taken along the line 6—6 of FIGURE 5.

The present embodiment is the preferred embodiment, but it is to be understood that changes can be made in the present embodiment by one skilled in the art without departing from the spirit and scope of the present invention.

For a general description of the present invention, reference is made to the drawings. The present invention is concerned with a rigid axle assembly which is connected between the two rear wheels of a tractor of the types used in farming or earth-moving operations. A somewhat diamond-shaped axle carrier is secured on top of the axle housing and pivotal means are provided between the axle carrier and the body of the tractor so that the carrier and axle as a unit may oscillate relative to the body of the tractor about an axis longitudinally of the tractor through an angle of approximately 36° or plus and minus 18° from a parallel position of the axle carrier relative to the body of the tractor. The rear pivotal connection of the axle carrier to the body is by means of a pin which is positioned longitudinally of the vehicle and the pivotal connection at the forward end of the axle carrier is by means of a pin having a spherical bearing, the pin being disposed transversely of the vehicle. The rear pin is positioned through two flanges depending from the body of the tractor and through a portion of the rear wall of the axle carrier as may be readily seen in FIGURE 4. Were it not for the front pin assembly, the clearance between the depending flanges and the walls of the carrier would permit longitudinal shifting of the body of the tractor relative to the axle and axle carrier assembly. The front pin assembly prevents this because of the transverse pin mounting arrangement. The transverse pin of the front pin assembly is carried by a pair of flanges depending from the body of the tractor and through a forwardly extending plate of the axle carrier. The central portion of the front pin carries the inner race of a spherical bearing and the outer race thereof is positioned in the forwardly extending plate of the axle carrier as may be seen in FIGURES 5 and 6. The front pin assembly permits the carrier to oscillate through an angle of approximately 36° relative to the body of the tractor. Any loading or forces applied to either the axle assembly or the body of the tractor which tend to move the body of the tractor longitudinally relative to the axle assembly, are absorbed in the front pin assembly.

Figure 1:
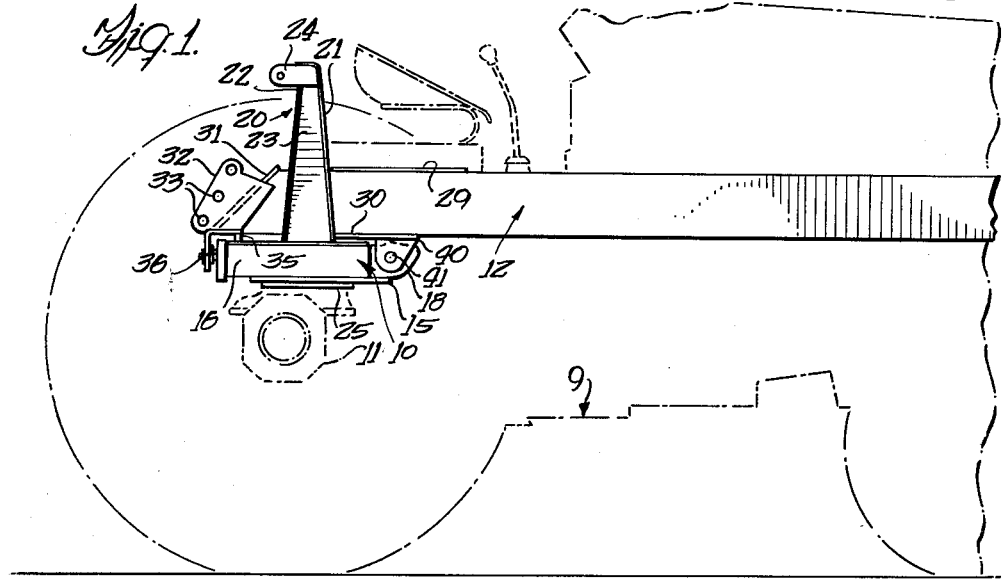
FIGURE 1 is a side elevational view of a tractor constructed according to the present invention.

Turning next to a detailed description of the present invention continued reference is made to the drawings. The outline 9 of a tractor, shown in FIGURE 1, environmentally displays the location of the present invention. The rearward end of the tractor comprises a pair of wheels connected to a rigid axle assembly such as 11. The axle carrier 10 is secured to the axle housing by any suitable means such as brackets and bolts. The frame 12 of the tractor is pivotally connected to the axle carrier 10 in the manner described below.

Figure 2:
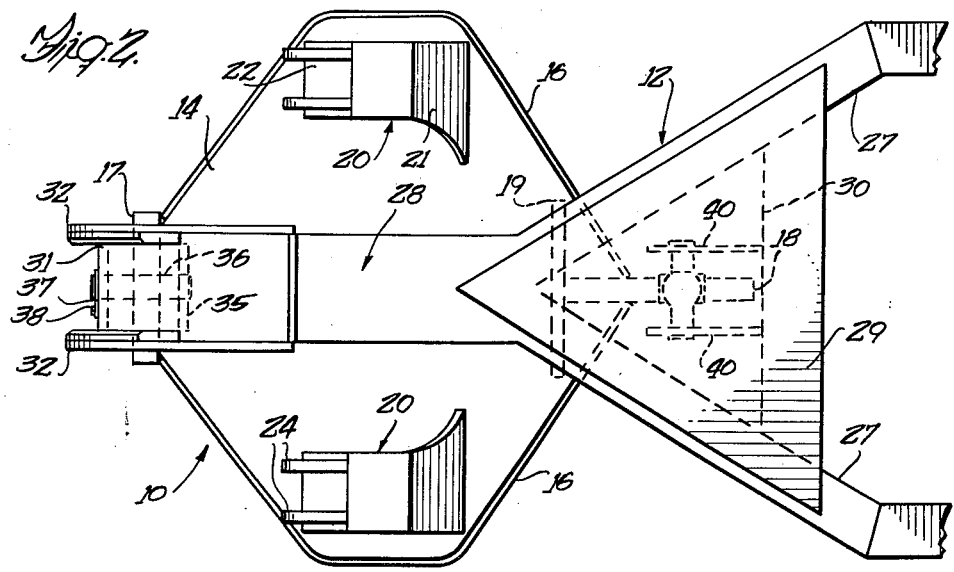
FIGURE 2 is a partial enlarged top plan view of the structure shown in FIGURE 1.

The axle carrier 10 is somewhat diamond-shaped in the plan view as may be seen in FIGURE 2 and comprises an upper plate 14 and a lower plate 15 interconnected by the sidewalls 16 so formed as to render the carrier 10 sufficiently rigid. The upper plate 14 and the lower plate 15 need not be continuous over the entire area enclosed by the sidewalls 16 but may be discontinued over portions thereof or may have portions thereof which are cut out without affecting the overall rigidity of the carrier 10. A plate 17 is secured to the rearward end of the carrier 10 as a rear wall thereof. The forward end of the carrier 10 is provided with a vertically positioned and forwardly extending plate 18 which is secured between the sidewalls 16, to the upper wall 14 and to a reinforcing plate 19 which may be seen in FIGURE 2. The carrier 10 is also supplied with a pair of upstanding towers 20 which are mounted on the upper plate 14 one on each side of the carrier 10. The towers 20 are provided for the operative connection of an earth-working or material-handling implement or hitch (not shown) thereto, and each tower 20 comprises a forward wall 21, a rearward wall 22 and a web 23. The forward wall 21, the rearward wall 22, and the web 23 are secured together somewhat as an H-member. The upper end of each tower 20 is provided with a pair of spaced apart flanges 24 having aligned holes formed therethrough for connection to a suitable material handling implement. The carrier 10 is further provided with a plate 25 on the underside thereof, and provides means by which the carrier may be secured to the axle housing 11.

The frame 12 of the body of the tractor is formed to be considerably narrowed at its rearward end as may be seen in FIGURE 2. The side members 27 of the frame 12 converge substantially to a point at the forward end of the beam section 28. A somewhat triangular-shaped plate 29 is secured over the converging portion of the frame as reinforcing therefor. A further reinforcing plate 30 is secured to the underside of the frame 12 at the converging portion thereof. The rearward end of the beam portion 28 of the frame 12 is provided with a plate 31 which is secured to the frame 12 with the lower end thereof positioned to depend from the frame 12. A pair of tool mounting flanges 32 are also provided for the frame 12 and are secured one on each side of the beam portion 28 of the frame 12 at the rearward end thereof. Suitable aligned holes 33 are formed through the flanges 32 to permit the attachment of a material handling or earth-working tool thereto.

For the pivotal connection of the frame 12 at its rearward end thereof to the rearward end of the axle carrier 16, a further flange or plate 35 is secured to the underside of the beam portion 28 of the frame 12 to depend therefrom in a spaced arrangement from the depending portion of the plate 31 longitudinally of the tractor. At the lower ends thereof, the plate 31 is disposed on the rearward side of the plate 17 of the axle carrier 10, and the flange 35 is positioned on the forward side of the plate 17 through a suitable opening in plate 14. The distance between the depending portions of the plate 31 and the flange 35 is greater than the thickness of the plate 17. Longitudinally aligned holes are formed through the depending portions of the plate 31, and the flange 35 and through the plate 17 for insertion of the pin 36. The holes in the members 31, 17, and 35 may be provided with suitable bushings to minimize wear of the pin 36. The pin 36 is provided with a flange 37 welded thereto such as may be seen in FIGURE 3, and the flange 37 is provided with an opening for the cap screw 38. The cap screw 38 which is threaded into plate 31 prevents the pin 36 from working itself out of the holes through the members 31, 17, and 35 in the operation of the tractor. The pin 36 is disposed substantially on a longitudinal center line of the tractor and of the axle carrier 10. The pin 36 positions the axle carrier 10 a distance sufficiently below the underside of the frame 12 so that the axle carrier may oscillate about the axis of the pin 36 and relative to the frame 12 through an angle of at least 36°.

The present invention further provides, for the front mounting of the carrier 10 to the frame 12, a pair of depending flanges 40 which are secured to the underside of the plate 30 of the frame 12. The flanges 40 are secured in a spaced-apart relationship to each other transversely of the frame 12 as may be seen in FIGURE 2 and are disposed one on each side of the plate 18 of the axle carrier 10. Axially aligned transversely positioned holes are formed through the flanges 40 and the plate 18 for the insertion of the pin 41. The pin 41 carries the inner race 42 of a spherical bearing, and the outer race 43 of that bearing is secured in the hole in the plate 18. The inner race 42 has an inner diameter substantially equal to the diameter of the pin 41 and a pair of spacer rings 44 are also provided to position the inner rod 42 between the depending flanges 40. The pin 41 is inserted through the depending flanges 40, the spacing rings 44 and the inner race 42 of the spherical bearing and is secured therein by a cap screw 45 which is positioned through a suitable hole in a plate 46 and threaded into one of the depending flanges 40. The plate 46 which is similar to plate 37 of the rear pin is secured to the end of the pin 41 by some means such as welding and the portion thereof which is provided with the hole for the cap screw 45 extends radially outwardly from the pin 41 a certain distance. The above-described arrangement for the pin 41 permits a certain limited universal action of the plate 18 between the flanges 40, and in the present embodiment it has been found that if the angle A is approximately 18°, suitable operation of the present invention results.

In the operation of the present invention the frame or body of the tractor may oscillate relative to the axle carrier 10 and the rear axle and wheel assembly secured thereto about an axis longitudinally of and at the transverse center of the vehicle, that axis being generally positioned through the axis of pin 36 and the center of the spherical bearing of the front pin 41. Because of the described arrangement there are no other movements of the axle carrier 10 relative to the frame 12. Especially lacking is any shifting of the axle carrier 10 longitudinally of the frame 12 because of the construction of the front pin assembly. Any loading on the tractor which tends to shift the axle carrier 10 longitudinally relative to the frame 12 is absorbed in the front pin assembly, which by preventing shifting of the axle carrier 10 relative to the frame 12 greatly increases the durability of the tractor.

Having described the invention what is considered new and desired to be protected by Letters Patent is:

1. In a vehicle having a rigid axle assembly interconnecting a pair of wheels, an arrangement for mounting the frame of said vehicle on said axle assembly for a certain limited range of oscillation of the frame of the vehicle relative to the axle assembly about an axis positioned longitudinally of the vehicle comprising, an axle carrier securable on said axle assembly, pin means including a pin connected between one end of the frame of said vehicle and one end portion of said axle carrier, said pin being positioned longitudinally of said vehicle and said pin means being formed to permit pivotal movement of said carrier relative to said frame about the axis of said pin, a second pin means including a second pin, flange means connected to another end portion of said axle carrier on the side thereof opposite from said one end and to said second pin, second flange means connected to the underside of the frame of said vehicle immediately above said another end of said axle carrier and to said second pin, said first and second flange means positioned longitudinally of the vehicle, and said first and second flange means positioning said second pin transversely of said vehicle and substantially intersecting the axis of said first pin and said second pin means being formed with a partial spherical bearing on said second pin for permitting limited pivotal movement of said frame relative to said carrier about an axis substantially coincident with the axis of said first pin and for preventing any shifting of said carrier longitudinally of said frame of said vehicle.

2. In a vehicle having a rigid axle assembly interconnecting a pair of wheels, an arrangement for mounting the frame of said vehicle on said axle assembly for a certain limited range of oscillation of the frame of the vehicle relative to the axle assembly about an axis positioned longitudinally of the vehicle comprising, an axle carrier securable on said axle assembly, pin means including a pin connected between one end of the frame of said vehicle and one end portion of said axle carrier, said pin being positioned longitudinally of said vehicle, and said pin means being formed to permit pivotal movement of said carrier relative to said frame about the axis of said pin, a second pin means comprising a vertically positioned plate carried on said axle carrier on the side thereof opposite from said one end portion, a pair of flanges secured on the underside of said frame of said vehicle to depend therefrom on each side of said plate, a second pin carried through said pair of flanges and said plate and positioned transversely of said vehicle and substantially intersecting the axis of said first pin, a spherical bearing carried on said second pin and in said plate for permitting limited pivotal movement of said frame relative to said carrier about an axis substantially coincident with the axis of said first pin and for preventing any shifting of said carrier longitudinally of said frame of said vehicle.

3. In a vehicle having a rigid axle assembly interconnecting a pair of wheels, an arrangement for mounting the frame of said vehicle on said axle assembly for a certain limited range of oscillation of the frame of the vehicle relative to the axle assembly about an axis positioned longitudinally of the vehicle comprising, an axle carrier securable on said axle assembly, a pair of flanges carried on said frame of said vehicle and positioned to depend therefrom in a spaced-apart relationship longitudinally of the vehicle, openings formed through said pair of flanges along an axis longitudinally centrally positioned on said vehicle, an opening formed through one end of said axle carrier at a transversely central position thereof, a pin carried in said openings of said pair of flanges and said opening through said carrier with the portion of said carrier carrying said opening interposed being between said pair of flanges so that said carrier is pivotable relative to said frame about the axis of said pin, said pair of flanges being spaced apart a distance greater than the thickness of the portion of said carrier interposed therebetween, a second pin means including a second pin connected between another end portion of said axle carrier on the side thereof opposite from said one end and the underside of the frame of said vehicle immediately above said another end of said axle carrier, said second pin being positioned transversely of said vehicle and substantially intersecting the axis of said first pin and said second pin means being formed with a partial spherical bearing on said second pin for permitting limited pivotal movement of said frame relative to said carrier about an axis substantially coincident with the axis of said first pin and for preventing any shifting of said carrier longitudinally of said frame of said vehicle.

4. In a vehicle having a rigid axle assembly interconnecting a pair of wheels, an arrangement for mounting the frame of said vehicle on said axle assembly for a certain limited range of oscillation of the frame of the vehicle relative to the axle assembly about an axis positioned longitudinally of the vehicle comprising, an axle carrier securable on said axle assembly, a pair of flanges carried on said frame of said vehicle and positioned to depend therefrom in a spaced-apart relationship longitudinally of the vehicle, openings formed through said pair of flanges along an axis longitudinally centrally positioned of said vehicle, an opening formed through one end of said axle carrier at a transversely central position thereof, a pin carried in said openings of said pair of flanges and said opening through said carrier with the end of said carrier carrying said opening being interposed between said pair of flanges so that said carrier is pivotable relative to said frame about the axis of said pin, said pair of flanges being spaced apart a distance greater than the thickness of the end of said carrier interposed therebetween, pin means comprising a vertically positioned plate carried on said axle carrier on the side thereof opposite from said one end, a second pair of flanges secured on the underside of said frame of said vehicle to depend therefrom on each side of said plate, a second pin carried through said second pair of flanges and said plate and positioned transversely of said vehicle and substantially intersecting the axis of said first pin, a spherical bearing carried on said second pin and in said plate for permitting limited pivotal movement of said frame relative to said carrier about an axis substantially coincident with the axis of said first pin and for preventing any shifting of said carrier longitudinally of said frame of said vehicle.

5. In a vehicle having a rigid axle assembly interconnecting a pair of wheels, an arrangement for mounting the rearward portion of the frame of said vehicle on said axle assembly for a certain limited range of oscillation of the frame of the vehicle relative to the axle assembly about an axis positioned longitudinally and at the transverse center of the vehicle comprising, an axle carrier securable on said axle assembly with one portion of said carrier extending rearwardly of said axle assembly and with another portion thereof extending forwardly of said axle assembly, pin means including a pin connected between the rearward end of the frame of said vehicle and the rearward end of the rearward portion of said axle carrier, said pin being positioned longitudinally of and at the transverse center of said frame of said vehicle and of said carrier, said pin means being formed to permit pivotal movement of said carrier relative to said frame about the axis of said pin, a second pin means comprising a vertically positioned plate carried at the forward end of the forward portion of said axle carrier and being further positioned to extend forwardly of said carrier, a pair of flanges secured on the underside of said frame of said vehicle to depend therefrom on each side of said plate forwardly of said carrier, said pair of flanges further being positioned a certain spaced-apart distance on each side of the axis of said first pin, a second pin carried through said pair of flanges and said plate and positioned transversely of said vehicle and substantially intersecting the axis of said first pin, a spherical bearing carried on said second pin and in said plate for permitting limited pivotal movement of said frame relative to said carrier about an axis substantially coincident with the axis of said first pin and for preventing any shifting of said carrier longitudinally of said frame of said vehicle.

6. In a vehicle having a rigid axle assembly interconnecting a pair of wheels, an arrangement for mounting the rearward portion of the frame of said vehicle on said axle assembly for a certain limited range of oscillation of the frame of said vehicle relative to the axle assembly about an axis positioned longitudinally and at the transverse center of the vehicle comprising, an axle carrier securable on said axle assembly, a pair of flanges carried on the rearward end of said frame of said vehicle and positioned to depend therefrom in a spaced-apart relationship longitudinally of the vehicle, said pair of flanges further being positioned at the transverse center of said frame, the rearward end of said carrier being formed to have the rearwardmost section thereof disposed between said pair of flanges, openings formed through said pair of flanges and said rearwardmost portion of said carrier along an axis longitudinally centrally positioned of said vehicle, a pin carried in said openings of said pair of flanges and said opening through said carrier so that said carrier is pivotable relative to said frame about the axis of said pin, said pair of flanges being spaced apart a distance greater than the thickness of the rearwardmost portion of said carrier interposed therebetween, a second pin means including a second pin connected between the forward end of said axle carrier and the underside of said frame of said vehicle above said forward end of said axle carrier, said second pin being positioned transversely of said vehicle and substantially intersecting the axis of said first pin and said second pin means being formed with a partial spherical bearing on said second pin for permitting limited pivotal movement of said frame relative to said carrier about an axis substantially coincident with the axis of said first pin and for preventing any shifting of said carrier longitudinally of said frame of said vehicle.

7. In a vehicle having a rigid axle assembly interconnecting a pair of wheels, an arrangement for mounting the frame of said vehicle on said axle assembly for a certain limited range of oscillation of the frame of the vehicle relative to the axle assembly about an axis positioned longitudinally and at the transverse center of the vehicle comprising, an axle carrier securable on said axle assembly, a pair of flanges carried on the rearward end of said frame and positioned to depend therefrom in a spaced-apart relationship longitudinally and at the transverse center of the vehicle, the rearwardmost portion of said axle carrier being formed and positioned between said pair of flanges, openings formed through said pair of flanges and said rearwardmost portion of said carrier along an axis longitudinally centrally positioned of said vehicle, a pin carried in said openings of said pair of flanges and said opening through said rearwardmost portion of said carrier so that the carrier is pivotable relative to said frame about the axis of said pin, said pair of flanges being spaced apart a distance greater than the thickness of the rearwardmost portion of said carrier interposed therebetween, second pin means comprising a vertically positioned plate carried on the forward end of said axle carrier and extending forwardly thereof, a second pair of flanges secured on the underside of said frame of said vehicle to depend therefrom on each side of said plate, a second pin carried through said pair of flanges and said plate and positioned transversely of said vehicle and substantially intersecting the axis of said first pin, a spherical bearing carried on said second pin and in said plate for permitting limited pivotal movement of said frame relative to said carrier about an axis substantially coincident with the axis of said pin and for preventing any shifting of said carrier longitudinally of said frame of said vehicle.

References Cited in the file of this patent

UNITED STATES PATENTS

| | | |
|---|---|---|
| 1,564,090 | Meiklejohn | Dec. 1, 1925 |
| 2,336,814 | Suter | Dec. 14, 1943 |
| 2,491,283 | Schoenrock | Dec. 13, 1949 |
| 2,731,898 | Frevik et al. | Jan. 24, 1956 |

FOREIGN PATENTS

| | | |
|---|---|---|
| 425,098 | Germany | Feb. 11, 1926 |